(12) United States Patent
Arguelles et al.

(10) Patent No.: US 8,930,330 B1
(45) Date of Patent: Jan. 6, 2015

(54) VALIDATION OF LOG FORMATS

(75) Inventors: Carlos A. Arguelles, Shoreline, WA (US); Mark E. Brighton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 591 days.

(21) Appl. No.: 13/169,391

(22) Filed: Jun. 27, 2011

(51) Int. Cl.
*G06F 7/00* (2006.01)
*G06F 17/00* (2006.01)

(52) U.S. Cl.
USPC ............................................. 707/694

(58) Field of Classification Search
USPC .............................. 707/694, 999.1
See application file for complete search history.

(56) References Cited

U.S. PATENT DOCUMENTS

| | | | |
|---|---|---|---|
| 6,728,879 B1 | 4/2004 | Atkinson | |
| 7,610,329 B2 | 10/2009 | Bone et al. | |
| 7,769,723 B2 | 8/2010 | Zheng et al. | |
| 2003/0046121 A1* | 3/2003 | Menninger et al. | 705/7 |
| 2005/0262161 A1* | 11/2005 | Holmes et al. | 707/202 |
| 2008/0168081 A1* | 7/2008 | Gaurav et al. | 707/102 |
| 2008/0208924 A1* | 8/2008 | Bradshaw et al. | 707/202 |
| 2009/0024551 A1* | 1/2009 | Agrawal et al. | 706/47 |
| 2009/0193393 A1* | 7/2009 | Baldwin et al. | 717/115 |

* cited by examiner

*Primary Examiner* — Aleksandr Kerzhner
(74) *Attorney, Agent, or Firm* — Robert C. Kowert; Meyertons, Hood, Kivlin, Kowert & Goetzel, P.C.

(57) ABSTRACT

Systems and methods for validation of log formats are described herein. Log data is stored via a logging service in a data store or other storage system. An example log or proposed log format is received by the logging service. The proposed log format is validated against validation rules provided by log consumers.

23 Claims, 6 Drawing Sheets

VALIDATION OF LOG FORMATS

BACKGROUND

Systems associated with sites in a networked environment, such as electronic commerce systems, content delivery networks, search engines, or any other type of site, can generate large amounts of log data associated with requests for content from users via client devices. Log data can also be generated by other types of systems that might not be related to content requests, such as, but not limited to, inventory management systems, order processing systems, logistics systems, supply chain management systems, storage networks, or any other type of computing system or environment.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure are related to managing log data that can be generated by various systems in a networked environment. Systems associated with sites in a networked environment, such as electronic commerce systems, content delivery networks, search engines, or any other type of site, can generate large amounts of log data associated with requests for content from users via client devices. Large amounts of log data can also be generated by other types of systems that might not be related to content requests, such as, but not limited to, inventory management systems, order processing systems, logistics systems, supply chain management systems, storage networks, or any other type of computing system or environment. Accordingly, a logging service can be employed to warehouse log data generated by various types of systems that can be known as log producer systems or log producers.

Such a logging system can include a logging service executed on one or more computing devices that receives log data from a log, processes log data or transforms log data into a storage format specified by the logging service and subsequently stores the log data from the log producer in a data store or other storage system. Accordingly, as other systems, applications and services can retrieve warehoused log data from the logging service for various uses as will be described herein. If a log producer modifies or alters the format or contents of log data generated and warehoused by the logging services, this log data may become unusable or cause errors in the applications employed by log consumers that rely on the log data. In the following discussion, a general description of one embodiment of the disclosure and its components is provided, followed by a discussion of the operation of the same.

Figure 1:
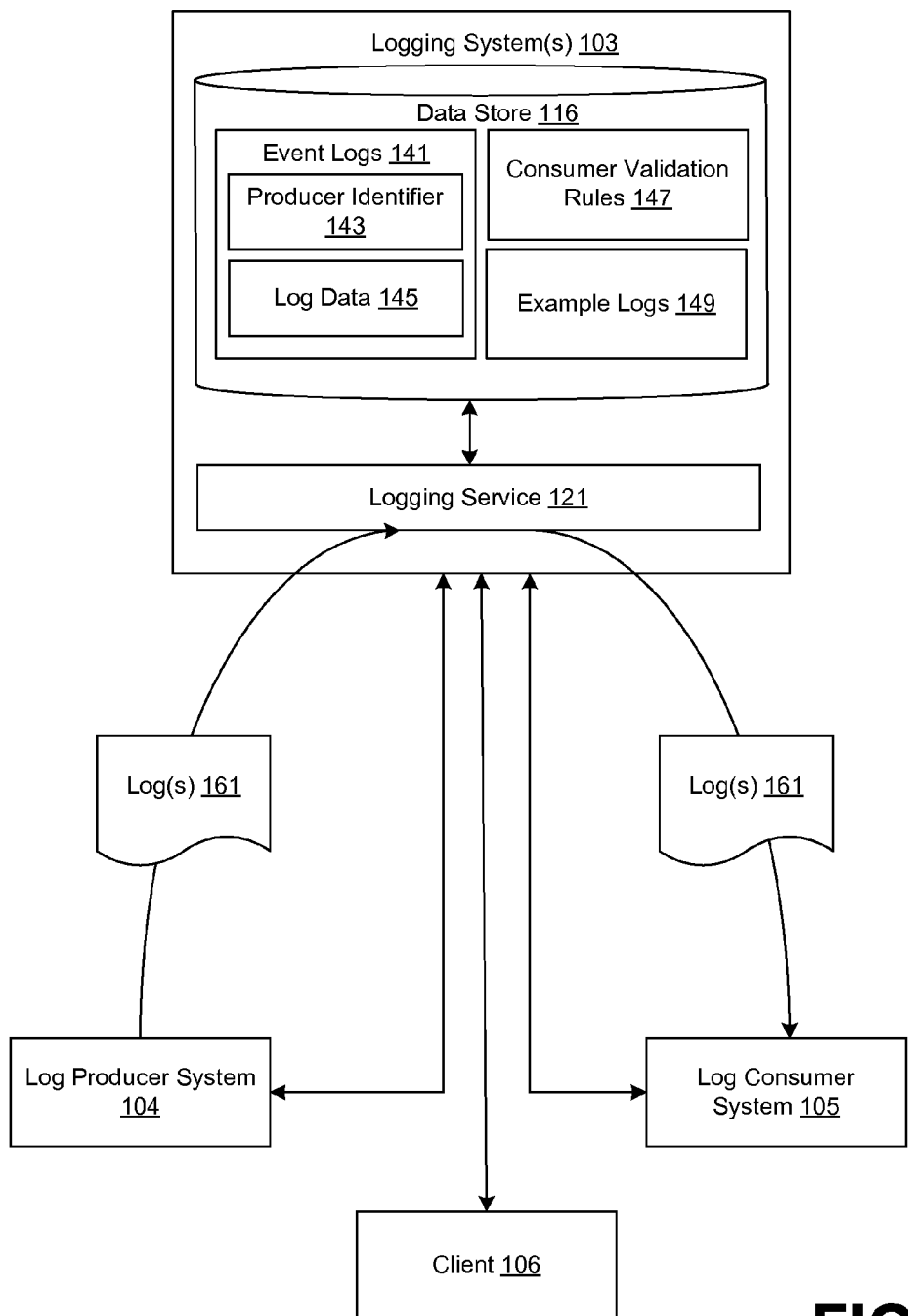
FIG. 1 is a drawing of a networked environment according to various embodiments of the present disclosure.

With reference to FIG. 1, shown is a networked environment 100 according to various embodiments. The networked environment 100 includes at least one logging system 103, at least one log producer system 104, and at least one long consumer system 105 in communication via one or more network. Such a network can include, for example, the Internet, intranets, extranets, wide area networks (WANs), local area networks (LANs), wired networks, wireless networks, or other suitable networks, etc., or any combination of two or more such networks.

The logging system 103 may comprise, for example, a computing device, a server computer or any other system providing computing capability. Alternatively, a plurality of logging systems 103 may be employed that are arranged, for example, in one or more server banks or computer banks or other arrangements. For example, a plurality of logging system 103 together may comprise a cloud computing resource, a grid computing resource, and/or any other distributed computing arrangement. Such logging systems 103 may be located in a single installation or may be distributed among many different geographical locations. For purposes of convenience, the logging system 103 is referred to herein in the singular. Even though the logging system 103 is referred to in the singular, it is understood that a plurality of logging systems 103 may be employed in the various arrangements as described above. Additionally, the log producer system 104 and the log consumer system 105 can also represent one or more computing devices and/or resources that are similar in nature to the logging system 103. Additionally, a log producer system 104 and a log consumer system 105 can also represent a single computing device. However, they are depicted separately herein for ease of depiction and discussion of the various embodiments of the disclosure.

Various applications and/or other functionality may be executed in the logging system 103 according to various embodiments. Also, various data is stored in a data store 116 that is accessible to the logging system 103. The data store 116 may be representative of a plurality of data stores as can be appreciated. The data stored in the data store 116, for example, is associated with the operation of the various applications and/or functional entities described below. In one embodiment, the data store 116 can be implemented in one computing device 103, and the other elements depicted can be implemented in other computing devices 103 as can be appreciated.

The components executed on the logging system 103, for example, include the logging service 121, and other applications, services, processes, systems, engines, or functionality not discussed in detail herein. The logging service 121 is executed to facilitate receiving and storage of log data from log producer systems 104. The logging service 121 also facilitates providing requested log data warehoused via the logging service 121 to log consumer systems 105. The logging service 121 also facilitates validation of proposed formats for event logs that represent changes to a previous log format as will be described herein.

The data stored in the data store 116 includes, for example, event logs 141, which can be indexed or sorted by a producer identifier 143. Event logs 141 can also include log data 145, which can represent logs generated by a log producer system 104 and transmitted to the logging service 121 for storage in the data store 116. The log data 145 can be provided in various formats, such as, but not limited to an extensible markup language (XML) based log format, a flat text based log format, or any other log format that is used in the art. The data store 116 can also include consumer validation rules 147 as well as example logs 149 corresponding to each log producer systems 104 and/or application or service that provides logs that represent an example of a log format employed by a log producer system 104 to house log data 145 in the data store 116 via logging service 121. An example log 149 can allow the format of a particular log provided by log producer systems 104 to be determined. In some embodiments, instead of or in addition to an example log 149 employed from which a log format can be ascertained, the data store 116 can include a log format specification that can define a log format for log data 145 transmitted to the logging service 121 by a log producer system 104. As contemplated herein, the data store 116 may be representative of many different data stores, a networked storage system, or any system in which log data can be housed. The data store 116 may comprise, for example, a cloud computing platform in which data is stored across various servers in redundant fashion.

The log producer system 104 represents any computing device or system in which event occur and in which logs are generated and transmitted to the logging service 121 for warehousing in the data store 116. In one embodiment, the log producer system 104 can represent a content delivery system that provides access to content that is served over the network. To this end, the content delivery system acts as a gateway through which requests are received and responses transmitted to clients. It is understood that other applications and components, such as an application implementing the hypertext transport protocol, may be executed on the log producer system 104 beyond those described herein. Accordingly, the log producer system 104 can execute logic that generates log data corresponding to an occurrence in the system. For example, each time a user on a client device initiates a request for content from the content delivery system, it may generate a log entry corresponding to a session of the user. Accordingly, various information about the content served to the client corresponding to the user in the session can be logged. For example, the identity of content shown to the user can be logged, which can include, but is not limited to the content pages requested by the user, advertisements shown to the user in the content pages served, data submitted by the user to the content delivery system (e.g., search terms, user identity information, or any other input data), the links followed by the user, and other data as can be appreciated.

The log producer system 104 may, in some embodiments, provide one or more applications that are involved, for example, in providing services offered by an online merchant or electronic commerce system. For example, the log producer system 104 may execute applications that facilitate the ordering of goods online by customers by manipulating a user interface on a client 106. Accordingly, in such an electronic commerce system, various events can occur which can be logged by the log producer system 104, which can include, but is not limited to, an identify of products displayed to the user, pricing information of products displayed to the user, shipping terms associated with products, whether the user submitted an order via the electronic commerce system, hyperlinks followed by the user, advertisements displayed to the user, or any other data related to an electronic commerce system that can be logged as can be appreciated. In the above examples, the log producer system 104 can also be any system that generates clickstream data corresponding to one or more users or clients, where the clickstream data is archived in the data store 116 via the logging service 121. The log producer system 104 can also generate user experience data that can be related performance of content delivery to a client device associated with a user, latency, or other performance data. In one example, the log producer system 104 can generate a content page rendered on a client device that includes client side code that reports user experience data to the log producer system 104. The log producer system 104 can in turn archive various user experience data via the logging service 121. As another specific example, a content page can include JavaScript code that reports browser performance data related to the rendering of pages in a client device to the log producer system 104, which can in turn generate logs 161 that are archived by the logging service 121 and made available to log consumer systems 105.

Accordingly, no matter the specific application implemented, the log producer system 104 is configured to generate logs 161 that are transmitted to the logging service 121 for archival in the data store 116 and/or retrieval via the logging service 121. The logging service 121 can then archive logs 161 received from a log producer system 104 as log data 145 associated with a producer identifier 143.

The log consumer system 105 can be any system that requests or retrieves log data 145 via the logging service 121 for any use. In one embodiment, a log consumer system 105 can execute one or more applications or services that receive log data 145 to execute a business rule. For example, a log consumer system 105 can include a pricing application that extracts log data 145 corresponding to one or more log producer systems 104 that are associated with an electronic commerce system. In this example, the pricing application can extract, from the log data 145, page views associated product detail pages, order history data, and other data in order to set pricing in real time for a particular product.

As is described herein, a log consumer system 105 can be associated with one or more consumer validation rules 147 housed in the data store 116. The consumer validation rules 147 can include one or more rules that can be validated against example logs 149 associated with a log consumer system 105. In other words, the validation rules 147 are associated with a log producer system 104 as well as a log consumer system 105 and describe constraints associated with a proposed log format that represents a change from a previous log format. In one embodiment, the validation rules 147 can identify fields in a proposed log format that should be present in order for an application or service executed by a log consumer system 105 to continue to be operable. A consumer validation rule 147 can also identify particular value constraints on various fields in an example log 149 associated with a log producer system 104. A consumer validation rule 147 can also specify a certain structure of a document representing log 161 associated with a log producer system 104. As another example, the consumer validation rule 147 can specify that certain data appear in certain locations within a log 161 associated with a log producer system 104.

A consumer validation rule 147 can also include one or more default validation rules that can be associated with the logging service 121, which can specify various requirements that are associated with the storage of any log data 145 in the data store 116. In this sense, the logging service 121 can also be thought of as a log consumer for which validation rules 147 can be specified as well as validated when an example log 149 corresponding to a change in a log format is provided that is associated with a log consumer system 104. For example, such a consumer validation rule 147 associated with the logging service 121 as a log consumer can specify basic validation data that can be required of any logs 161 provided by a log producer system 104 for archival in the data store 116. As one specific example, such a consumer validation rule 147 can specify that any log 161 provided by a log producer system 104 include a producer identifier 143 in a particular location and/or with a specific value range in a log 161. As another example, the consumer validation rule 147 can also specify that the log 161 include various other meta data with which the logging service 121 can categorize, sort, and/or index the log 161 in the data store 116. As some other examples, the validation rules 147 associated with a logging service 121 in this way can include rules that require the presence, a certain value range, or any other constraint associated with a merchant identifier, user identifier, or any other data within an example log 149 submitted to the logging service 121 for validation. Additional detail regarding validation of example logs 149 by the logging service 121 is provided below.

The client device 106 is representative of one or more client devices 106 that may be coupled to the network. The client device 106 may comprise, for example, a processor-based system, such as a computer system. Such a computer system may be embodied in the form of a desktop computer, a laptop computer, a personal digital assistant, a mobile device (e.g., cellular telephone, smart phone, etc.), tablet computing system, set-top box, music players, or other devices with like capability. The client device 106 can also include a display device upon which various content pages and other user interfaces may be rendered. The client device can also include one or more input devices with which a user can interact with a user interface rendered on the display device. For example, the client device 106 can include or be in communication with a mouse, touch input device (e.g., capacitive and/or resistive touchscreen), keyboard, or other input devices.

The client device 106 may be configured to execute various applications, such as a browser application and/or other applications. The browser application may be executed in a client device 106, for example, to access and render content pages, such as web pages, or other network content served up by the logging system 103 and/or other servers. The client device 106 may be configured to execute a special purpose application with which a user can interact with a user interface generated by a content delivery system or other type of system. In some embodiments, the example logs 149 and/or consumer validation rules 147 can be provided to the logging service 121 associated with a log producer system 104 or log consumer system 105 via a client 106 device.

Figure 2:
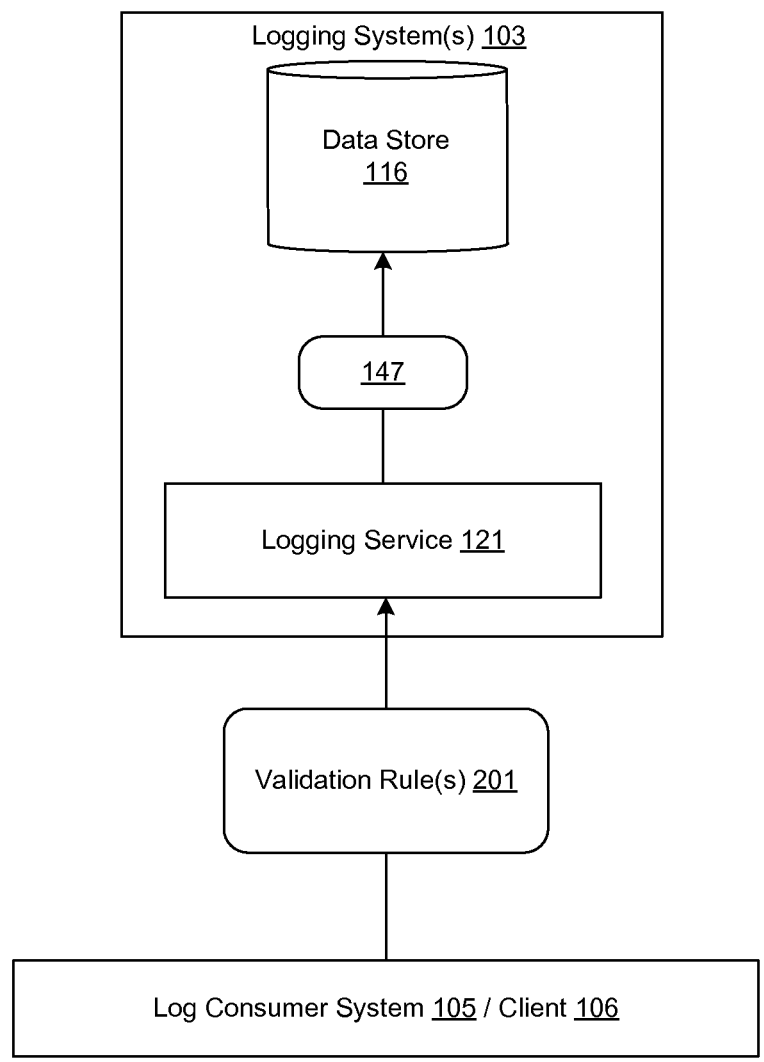
FIGS. 2-4 are alternative depictions of a logging system illustrating some examples of operations of the logging service from the networked environment of FIG. 1 according to various embodiments of the present disclosure.
Figure 3:
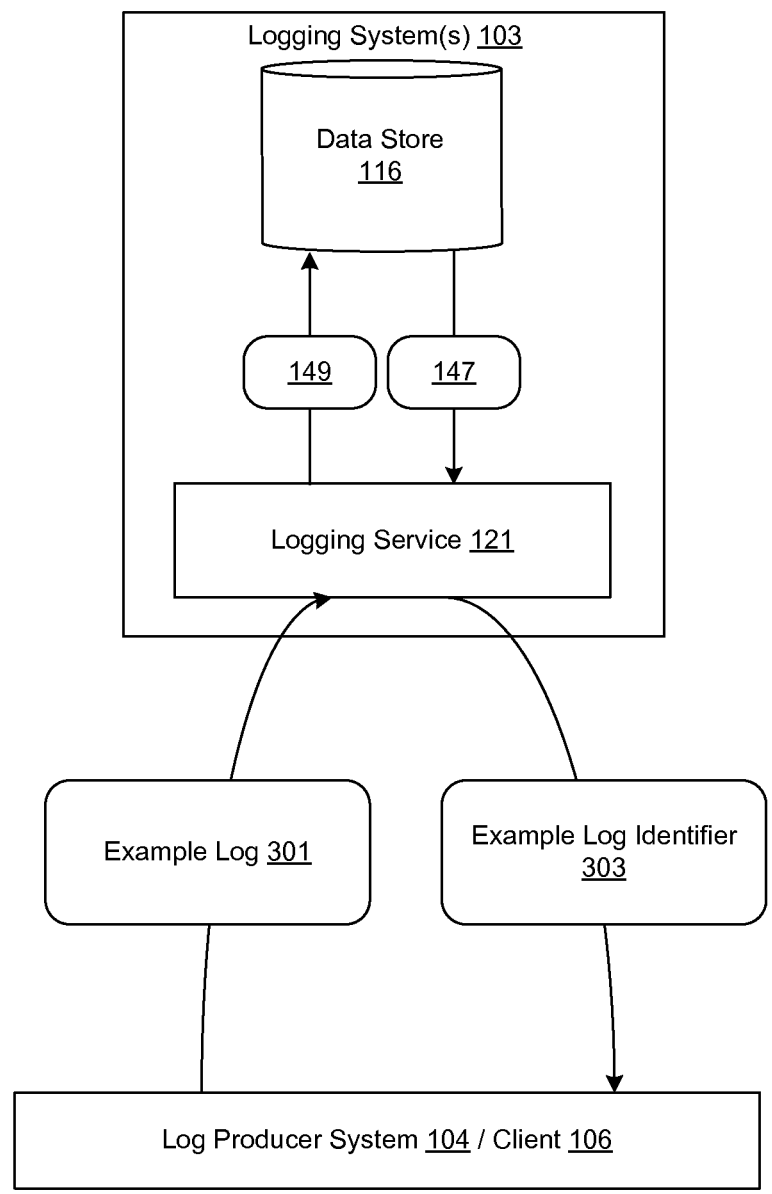
Figure 4:
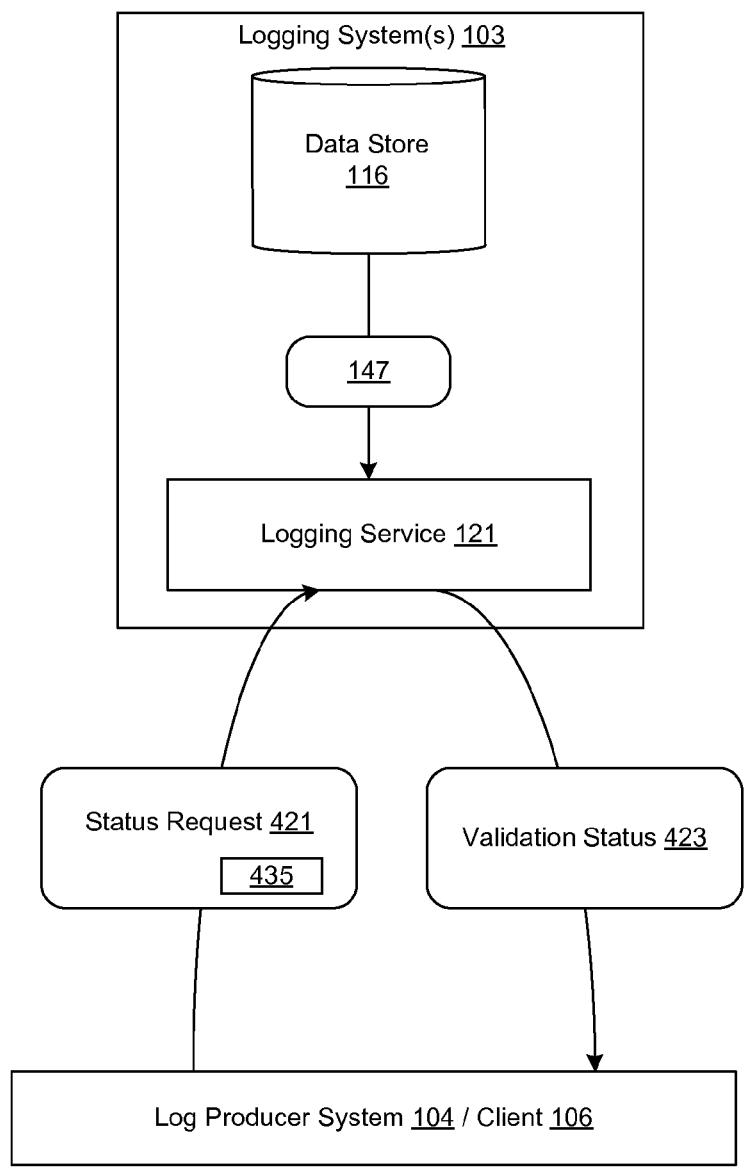

Next, additional discussion of various embodiments of the disclosure is provided in connection with FIGS. 2-4. Therefore, reference is made to FIG. 2 which illustrates an example of a consumer validation rule 147 that can be provided to the logging service 121. In the depicted example, a user, via a log consumer system 105 and/or a client 106, can interact with a user interface facilitated by the logging service 121 and submit one or more validation rules 147 via the network. As noted above, the validation rules 147 can identify one or more log producer systems 104 or producer identifiers 143 with which they are associated as well as include constraints and/or requirements that a proposed log format associated with a log producer system 104 must meet in order for the applications or services executed in a log consumer system 105 to operate successfully.

Applications and/or services generating log data 145 that is related to an event or occurrence within a log producer system 104 may undergo changes that cause the formatting and/or data provided within a log 161 to change over time. For example, a developer may check in code associated with a log producer system 104 that causes the formatting of logs 161 generated by the system to change. Accordingly, such a change may cause parsing of log data 145 received by a log consumer system 105 from the logging service 121 to fail, thereby potentially causing an application or service relying on the log data 145 to malfunction in some way. Accordingly, the consumer validation rules 147 associated with the log data 145 relied upon by the log consumer system 105 can be validated by the logging service 121 so that it can be determined before the logging service 121 provides log data 145 to a log consumer system 105 whether the validation rules 147 associated with the log consumer system 105 pass.

The consumer validation rules 201 can be provided to the logging service 121 and stored in the data store 116 in various ways and in various formats. In one embodiment, the validation rules 201 can be provided using an expression language that identifies certain variables in the log data 145 by name or identifier as well as an expected value and/or range of the variable. Additionally, a validation rule can identify a variable as well as an expected location of the variable in the log data 145 provided by the logging service.

Reference is now made to FIG. 3, which illustrates an example of the process of a log producer system 104 and/or client 106 providing one or more example logs 149 that include or specify a proposed event log format. In one embodiment, the example log 149 can be provided if a change in an application or service executed in a log producer system 104 cause a change in the format of logs 161 generated by the system. In one embodiment, the logging service 121 can receive an example log 301 associated with a log producer system 104 and store the example log 149 in the data store 116. Upon receiving an example log 149 associated with a given log producer system 104, the logging service 121 can initiate validation of one or more validation rules 201 associated with the example log 149. In other words, the logging service can validate the validation rules 201 of a log consumer system 105 that relies upon log data 145 corresponding to the log producer system 104 with which the example log 149 is associated.

The logging service 121 can then determine whether any of the validation rules 147 against which the example log 149 is validated fail. If any of the validation rules 147 fail, then in one embodiment, the logging service 121 can generate an alert and/or report that is transmitted to the log producer system 104, log consumer system 105, or any client 106 or user associated with either so that appropriate action can be taken to address or prevent such a failure before the log producer system 104 generates logs 161 that follow a format specified by the example log 149. In some embodiments, the logging service 121 can receive one or more new or updated consumer validation rules 147 associated with a particular producer identifier 143 and then initiate validation of the new or updated validation rules 147 against a log format specified by one or more example logs 149 referenced by the consumer validation rules 147 and/or example logs 149 associated with a producer identifier 143 referenced by the validation rules 147.

Reference is now made to FIG. 4, which illustrates an example of one way in which the logging service 121 can provide status information regarding validation of validation rules 147 that are associated with an example log 149 associated with a log producer system 104. The logging service 121 can implement a representational state transfer architecture to facilitate the process of a user submitting an example log as well as obtaining status information regarding execution of the validation rules 147 against an example log 149 by the logging service 121. In other words, the logging service 121 can provide a RESTful architecture to allow a user to obtain status information. Accordingly, in one embodiment, the logging service 121 can implement a protocol and allows a user via a client 106 to submit an example log 149 via a hypertext transfer protocol (HTTP) POST operation. The logging service 121 can respond to such a POST operation that includes an example log 149 with an example log identifier 303, which can comprise a unique identifier with which status information about success or failure of validation rules 147 against which the example log 149 is validated. In one embodiment, the logging service 121 can provide a uniform resource identifier (URI) such as a uniform resource locator (URL) and/or uniform resource name (URN) at which a user can retrieve a status report associated with the validation process.

For example, the logging service 121 can respond to an HTTP POST operation with a URI that includes a hostname and/or internet protocol (IP) address with a unique identifier concatenated thereto. Accordingly, a user can perform an HTTP GET operation via a browser or other application. In response to such a GET operation, the logging service can reply with a status report regarding the progress of the validation of the validation rules 147, passage or failure of the validation rules 147, and other status information. In the depicted example, a status request 421 can represent such a GET operation directed to a uniform resource identifier provided by the logging service upon receiving an example log 149. In response to such a GET operation, the logging service 121 can respond with a validation status 423. In some embodiments, the status request 421 can include a producer identifier 435 corresponding to an example log 149 as well as any other identifier that is assigned to the example log 149

As an example log 149 may be associated with one or more validation rules 147 that are potentially associated with more than one log consumer system 105, the validation status 423 can include a status report that identifies the log consumer system 105 and corresponding validation rule 147 for which an example log 149 has caused a failure. Additionally, in some embodiments, the logging service 121 can, upon completion of validation rules 147, generate a report identifying the various validation rules 147 and corresponding log consumer systems 105 that either pass or fail validation of the example log 149. Such a status report can be transmitted to operators of a log producer system 104 and/or log consumer system 105. Accordingly, operators of a log producer system 104 and/or log consumer system 105 can address potential failures of validation rules 147, whether this involves modifying a format of log data 145 and/or modifying an application and/or service executed in a log consumer system 105.

Figure 5:
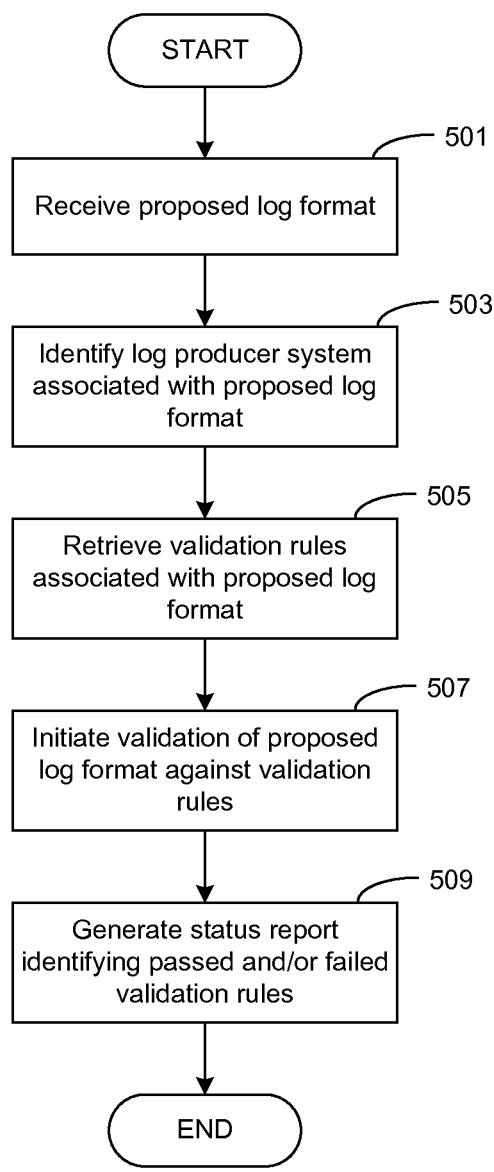
FIG. 5 is a flowchart illustrating one example of functionality implemented as portions of logging service executed in a logging system in the networked environment of FIG. 1 according to various embodiments of the present disclosure.

Referring next to FIG. 5, shown is a flowchart that provides one example of the operation of a portion of the logging service 121 according to various embodiments. It is understood that the flowchart of FIG. 5 provides merely an example of the many different types of functional arrangements that may be employed to implement the operation of the portion of the logging service 121 as described herein. As an alternative, the flowchart of FIG. 5 may be viewed as depicting an example of steps of a method implemented in the logging system 103 (FIG. 1) according to one or more embodiments.

Beginning with box 501, the logging service 121 can receive a proposed log format that can include an example log 149 (FIG. 1). In box 503, the logging service 121 can identify a log producer system 104 that is associated with the proposed log format. The log producer system 104 can be identified by an identifier within the proposed log format. In some embodiments, the logging service 121 can categorize and/or identify proposed log formats by an application and/or service executed in a log producer system 104 with which they are associated.

In box 505, the logging service 121 can retrieve one or more validation rules associated with the proposed log format. The validation rules can be associated with a particular log producer system 104 and/or an application or service executed within one or more log producer systems 104. In box 507, the logging service 121 can initiate validation of the proposed log format against the validation rules. In box 509, the logging service can generate a status report that identifies passed and/or failed validation rules associated with the validation step of box 507.

Figure 6:
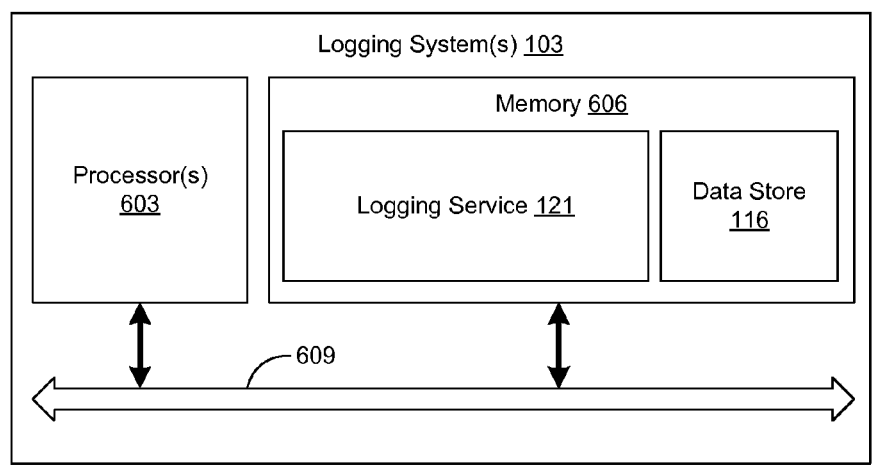
FIG. 6 is a schematic block diagram that provides one example illustration of a logging system employed in the networked environment of FIG. 1 according to various embodiments of the present disclosure.

With reference to FIG. 6, shown is a schematic block diagram of the logging system 103 according to an embodiment of the present disclosure. The logging system 103 includes at least one processor circuit, for example, having a processor 603 and a memory 606, both of which are coupled to a local interface 609. To this end, the logging system 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the logging service 121 and potentially other applications. Also stored in the memory 606 may be a data store 116 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the logging service 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the logging service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the logging service 121, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that receives a proposed format associated with event logging data from a client device via a hypertext transfer protocol (HTTP) POST operation;
   code that generates a unique identifier corresponding to the proposed format;
   code that responds to the HTTP POST operation to the at least one log producer client with a uniform resource identifier (URI) that includes the unique identifier;
   code that receives at least one validation rule associated with at least one log consumer system, the at least one validation rule corresponding to a rule associated with a use of the event logging data by the at least one log consumer system, wherein the use of the event logging data by the at least one log consumer system further comprises a business rule associated with an electronic commerce system;
   code that initiates validation that the proposed format complies with the at least one validation rule, the at least one validation rule associated with the at least one log consumer system;
   code that receives a request to retrieve a status associated with the validation that the proposed format complies with at least one validation rule, the request comprising an HTTP GET operation directed to the URI;
code that generates a validation status report, the validation status report comprising a status associated with validation of the at least one validation rule; and
code that responds to the HTTP GET operation with the validation status report.

2. A system, comprising:
at least one computing device; and
a logging service executable in the at least one computing device, the logging service comprising:
   logic that archives event logging data in a data store accessible to the at least one computing device, the event logging data associated with at least one log producer system, the event logging data corresponding to a plurality of events occurring in the at least one log producer system;
   logic that receives a proposed format associated with the event logging data from at least one log producer client via a hypertext transfer protocol (HTTP) POST operation;
   logic that generates a unique identifier corresponding to the proposed format;
   logic that generates a response to the HTTP POST operation and transmits the response to the at least one log producer client, the response comprising the unique identifier;
   logic that initiates validation that the proposed format complies with at least one validation rule, the at least one validation rule associated with at least one log consumer system;
   logic that receives a request from the at least one log producer client to retrieve a status associated with the validation that the proposed format complies with the at least one validation rule, the request comprising the unique identifier;
   logic that generates a validation status report, the validation status report comprising a status associated with validation of the at least one validation rule;
   logic that transmits the validation status report to the at least one log producer client;
   wherein the logic that generates the response to the HTTP POST operation further comprises logic that generates a uniform resource identifier (URI) corresponding to the proposed format, the URI comprising the unique identifier; and
   wherein the request from the at least one log producer client to retrieve the status associated with the validation that the proposed format complies with the at least one validation rule further comprises an HTTP GET operation directed to the URI.

3. The system of claim 2, wherein the at least one validation rule is associated with the logging service, the at least one validation rule corresponding to at least one default validation rule associated with a plurality of log producer systems.

4. The system of claim 2, wherein the logging service further comprises logic that receives at least one validation rule associated with the at least one log consumer system, the at least one validation rule corresponding to a rule associated with a use of the event logging data by the at least one log consumer system.

5. The system of claim 4, wherein the use of the event logging data by the at least one log consumer data further comprises a business rule associated with an electronic commerce system.

6. The system of claim 2, wherein the logic that validates further comprises:
   logic that identifies whether the proposed format does not pass a validation rule; and
   logic that generates a report identifying the validation rule that does not pass.

7. The system of claim 2, wherein the at least one log producer system further comprises a site configured to serve content requests from a plurality of client devices.

8. The system of claim 7, wherein the events occurring in the at least one log producer system correspond to the content requests from the plurality of client devices.

9. The system of claim 8, wherein the event logging data corresponds to an identity of content served to a client device in a content page requested by the client device.

10. The system of claim 7, wherein the event logging data further comprises activity data related to an electronic commerce system.

11. The system of claim 9, wherein the identity of content served to a client device further comprises at least one of: an identity of an advertisement in a content page, an identity of a product displayed in a content page, an identity of a pricing data displayed in a content page, and an identity of shipping terms displayed in a content page.

12. The system of claim 8, wherein the event logging data corresponds to user experience data collected by the at least one log producer system, the user experience data generated by the client devices and transmitted to the at least one log producer system.

13. The system of claim 2, wherein the logging service further comprises:
   logic that generates an alert if validation of at least one of the at least one validation rule fails; and
   logic that transmits the alert to a log consumer client.

14. A method, comprising:
   storing, in a data store in communication with at least one computing device, log data associated with a log producer system, the log data corresponding to a plurality of events occurring in the log producer system;
   receiving, via the at least one computing device, an example log associated with the log producer system from a log producer client via a hypertext transfer protocol (HTTP) POST operation, the example log representing a change in a log format associated with the log producer system;
   generating, via the at least one computing device, a unique identifier corresponding to the example log;
   generating, via the at least one computing device, a response to the HTTP POST operation and transmits the response to the log producer client, the response comprising the unique identifier; and
   validating, via the at least on computing device, that the example log complies with at least one validation rule, the at least one validation rule associated with at least one log consumer system;
   receiving, in the at least one computing device, a request to retrieve a status associated with the validation that the example log complies with at least one validation rule, the request comprising the unique identifier;
   generating, in the at least one computing device, a validation status report, the validation status report comprising a status associated with validation of each of the at least one validation rule;
   wherein generating the response to the HTTP POST operation further comprises generating, in the at least one computing device, a uniform resource identifier (URI) corresponding to the example log, the URI comprising the unique identifier; and wherein the request further comprises an HTTP GET operation directed to the URI from the log producer client to retrieve the status associated with the validation that the example log complies with the at least one validation rule.

15. The method of claim 14, wherein the at least one validation rule further comprises a rule associated with an application executed by the at least one log consumer system.

16. The method of claim 15, wherein the application executed by the at least one log consumer data further comprises a business rule associated with an electronic commerce system.

17. The method of claim 14, further comprising:
identifying, in the at least one computing device, whether the example log does not pass a validation rule; and
generating, in the at least one computing device, report identifying the validation rule that does not pass the validation rule.

18. The method of claim 14, wherein the at least one log producer system further comprises a site configured to serve content requests from a plurality of client devices.

19. The method of claim 18, wherein the events occurring in the log producer system correspond to the content requests from the plurality of client devices.

20. The method of claim 19, wherein the event logging data correspond to an identity of content served to a client device in a content page requested by the client device.

21. The method of claim 19, wherein the event logging data further comprises activity data related to an electronic commerce system.

22. The method of claim 20, wherein the identity of content served to a client device further comprises at least one of: an identity of an advertisement in a content page, an identity of a product displayed in a content page, an identity of a pricing data displayed in a content page, and an identity of shipping terms displayed in a content page.

23. The method of claim 19, wherein the event logging data corresponds to user experience data collected by the at least one log producer system, the user experience data generated by the client devices and transmitted to the at least one log producer system.

* * * * *